United States Patent [19]

Miyata et al.

[11] Patent Number: 5,047,203
[45] Date of Patent: Sep. 10, 1991

[54] PURIFIER FOR NUCLEAR REACTOR COOLING WATER AND METHOD OF PURIFICATION

[75] Inventors: Shigeo Miyata; Akira Okada, both of Takamatsu, Japan

[73] Assignee: Kyowa Chemical Industry Co., Ltd., Kagawa, Japan

[21] Appl. No.: 584,624

[22] Filed: Sep. 19, 1990

[30] Foreign Application Priority Data

Sep. 21, 1990 [JP] Japan ................................. 1-245544

[51] Int. Cl.⁵ ............................................. G21C 19/30
[52] U.S. Cl. ...................................... 376/310; 376/305
[58] Field of Search ......................... 376/310, 305, 306

[56] References Cited

U.S. PATENT DOCUMENTS

| | | | |
|---|---|---|---|
| 3,737,373 | 6/1973 | Kenj-Motojima et al. | 376/310 |
| 3,784,384 | 1/1974 | Webb | 376/310 |
| 4,224,177 | 9/1980 | Macedo et al. | 252/301.1 W |
| 4,422,965 | 12/1983 | Chickering et al. | 501/12 |
| 4,762,690 | 8/1988 | Brunner et al. | 423/3 |

FOREIGN PATENT DOCUMENTS 0134292 10/1979 Japan ................................. 376/310

OTHER PUBLICATIONS

Hitachi, Abstract of Japanese Patent Publication JP 60-113199.
Hitachi, Abstract of Japanese Patent Publication JP 60 022928.

*Primary Examiner*—Brooks H. Hunt
*Assistant Examiner*—Frederick H. Voss
*Attorney, Agent, or Firm*—Wenderoth, Lind & Ponack

[57] ABSTRACT

A purifier for nuclear reactor cooling water, which contains, as an active ingredient,
a titanium oxide-based solid solution of the formula (1)

$$(Ti_{1-x}Al_x)O_2 \qquad (1)$$

wherein x is defined by $0<x<0.5$, and/or
an aluminum oxide-based solid solution of the formula (2)

$$(Al_{1-y}Ti_y)_2O_3 \qquad (2)$$

wherein y is defined by $0<y<0.5$, and a method of purification of nuclear reactor cooling water, which comprises bringing nuclear reactor cooling water having a temperature of 100° to 300° C. into contact with the above purifier.

6 Claims, No Drawings

PURIFIER FOR NUCLEAR REACTOR COOLING WATER AND METHOD OF PURIFICATION

FIELD OF THE INVENTION

This invention relates to a purifier for nuclear reactor cooling water and a method of purification of nuclear reactor cooling water. More specifically, it relates to a purifier which adsorbs and absorbs radioactive elements and corrosive chloride ions, etc., contained in nuclear reactor cooling water at a high temperature and a method of purification of nuclear reactor cooling water.

PRIOR ART

Highly purified water is used as cooling water for a nuclear reactor. For safety operation of a nuclear reactor, the cooling water is required to be constantly maintained at a high purity. A trace amount of a metal is eluted into water from metal pipings for cooling water, and irradiated with neutron when it has reached a reactor core, whereby radioactive cobalt, iron, manganese, etc., are formed. These radioactive elements are harmful to a human body.

After purified water heated in a nuclear reactor drives a power-generating turbine, the purified water is cooled with seawater, etc., to recycle it, when a trace amount of chloride ion is included. The chloride ion causes corrosion on metal pipings, etc.

It is therefore required to purify cooling water by continuously removing the above impurities eluted into and included in the cooling water before the cooling water is recycled to a reactor core. The purification method that is generally carried out at present is as follows. Cooling water returned at about 280° C. is cooled to a temperature of 60° C. or below, and then allowed to pass through cation and anion exchange resin layers to remove the above harmful impurities. Then, the cooling water is re-heated to about 80° C. and recycled to a reactor core.

The above purification method involves loss of a large amount of heat, since a large amount of cooling water in a high-temperature state of about 280° C. is required to be cooled to about 60° C. or below, and heated again to about 80° C.

SUMMARY OF THE INVENTION

It is an object of this invention to provide a purifier capable of maintaining nuclear reactor cooling water at a high purity and a method of purification.

It is another object of this invention to provide a purifier capable of effectively removing harmful metal elements and chloride ion and a method of purification.

It is further another object of this invention to provide a purifier capable of removing harmful metal elements without cooling nuclear reactor cooling water used in a power-generating turbine and returned from the turbine, and a method of purification.

It is yet another object of this invention to provide a purifier capable of maintaining nuclear reactor cooling water at a high purity without involving loss of heat in operating a nuclear reactor, and a method of purification.

Further, it is another object of this invention to provide a purifier for nuclear reactor cooling water, whose ingredients are hardly eluted into the nuclear reactor cooling water.

According to this invention, there is provided a purifier for nuclear reactor cooling water, which contains, as an active ingredient, a titanium oxide-based solid solution of the formula (1)

$$(Ti_{1-x}Al_x)O_2 \text{ (Negatively charged, having cation exchangeability)} \quad (1)$$

wherein x is defined by $0<x<0.5$, and/or an aluminum oxide-based solid solution of the formula (2)

$$(Al_{1-y}Ti_y)_2O_3 \text{ (Positively charged, having anion exchangeability)} \quad (2)$$

wherein y is defined by $0<y<0.5$.

Further, according to this invention, there is provided a method of purification of nuclear reactor cooling water, which comprises bringing the nuclear reactor cooling water having a temperature of about 100° to 300° C. into contact with the above purifier.

DETAILED DESCRIPTION OF THE INVENTION

The present inventors made a diligent study in order to overcome the problems of the above conventional purification method, and completed this invention by finding the following: When a solid solution of $Al_2O_3$ in titanium oxide, represented by the formula (1), and/or a solid solution of titanium oxide in aluminum oxide, represented by the formula (2) is/are used as a purifier, harmful radioactive elements and chloride ion can be removed even at a temperature of about 280° C. or more, and the amount of the above purifier that is eluted into water is negligibly small.

The $TiO_2$—$Al_2O_3$-based solid solution used in this invention can withstand a high temperature of about 280° C. or more, which temperature is far higher than a temperature conventional ion exchange resins can withstand. This $TiO_2$—$Al_2O_3$-based solid solution is used as a purifier by bringing water which has returned from a turbin and has a temperature of about 280° C., i.e. nuclear reactor cooling water, into the purifier of this invention without adding any cooling operation, whereby harmful contents can be removed. Further, components consisting the purifier are not eluted into water, or the purity of the cooling water is not reduced and high purity of the cooling water can be maintained.

The titanium oxide-based solid solution of the formula (1) has excellent adsorptivity mainly for radioactive elements such as cobalt, iron, and manganese ions. The aluminum oxide-based solid solution of the formula (2) has excellent adsorptivity mainly for chloride ion. For this reason, the purifier of this invention can exhibit better performances when both of the above compounds are used in combination, although these compounds may be used alone.

The titanium oxide-based solid solution and the aluminum oxide-based solid solution can be produced, e.g. as follows. A water-soluble titanium compound such as $TiCl_3$, $TiCl_4$, $Ti_2(SO_4)_3$, $Ti(SO_4)_2$, $TiI_4$ or the like and a water-soluble aluminum compound such as $AlCl_3$, $AlBr_3$, $AlI_3$, $Al(NO_3)_3$, $Al_2(SO_4)_3$, $KAl(SO_4)_2$ or the like are dissolved in water such that an intended atomic ratio is obtained, and thereafter, an alkaline substance such as ammonia, NaOH, KOH, $Ca(OH)_2$ or the like is added in such an amount that is about an equivalent weight to Ti and Al or less to form a precipitate. The precipitate is washed to remove impurities, and fired at about 200° to 1,000° C.

Further, the titanium oxide-based solid solution and the aluminum oxide-based solid solution may be produced as follows. An organic compound of titanium and an organic compound of aluminum are dissolved in an organic solvent such that an intended Ti/Al atomic ratio is obtained, and then hydrolyzed by adding water. The resultant precipitate is recovered, and then fired at about 200° to 1,000° C.

Examples of the above organic compound of titanium are $Ti[O(CH_2)_3CH_3]_4$, $[Ti(OC_4H_9)_n]_4$, $Ti[OCH(CH_3)_2]_4$, $(C_2H_5)_2TiCl_2$, $Ti[OCH_2CH(C_2H_5)C_4H_9]_4$, $Ti(O\text{-iso-}C_3H_7)_2[OC(CH_3)CHCOCH_3]_2$, $Ti(O\text{-normal-}C_4H_9)_2[OC_2H_4(C_2H_4OH)_2]_2$, and the like.

Examples of the above organic compound of aluminum are $Al[OCH(CH_3)_2]_3$, $Al[CH_3(CH_2)_{10}COO]_3$, $Al[O(CH_2)_3CH_3]_3$, and the like.

Examples of the above organic solvent are isopropanol, n-hexane, benzene, toluene, methyl chloroform, carbon tetrachloride, and the like.

The purifier of this invention may have a powder form. However, it is preferably granulated into a spherical or cylindrical form having a diameter of 1 to 50 mm. A granulated purifier has advantages that the resistance of the purifier to flowing water is reduced and that the purifier is free from inclusion into water. The granulation can be carried out by an extrusion, rolling, fluidized-bed, or compression granulation method. In the granulation, water alone may be added. However, a suitable binder, such as alumina, boehmite, polyvinyl alcohol, etc., may be added.

According to this invention, there are provided a purifier having excellent adsorptivity for harmful metal ions of cobalt, iron, manganese, etc., and chloride ion, and a method of purification.

According to this invention, there are provided a purifier which does not cause loss of heat in operation of a nuclear reactor due to excellent adsorptivity even when cooling water returned from a turbine, i.e. cooling water returned from a reactor core is not specially cooled and due to very low level of elution of its component into cooling water, and a method of purification.

This invention will be explained more in detail hereinbelow by reference to Examples.

EXAMPLE 1

An aqueous solution containing 0.1 mol/l of aluminum chloride and an aqueous solution containing 0.5 mol/l of titanium tetrachloride were respectively prepared. 4 Liters of each of these solutions were mixed to form a mixture solution having an Al/Ti molar ratio of 0.2.

While the mixture solution was maintained at about 30° C. and stirred with a chemistirrer, 1.07 l of ammonia water containing 6 mol/l of ammonia was added. This amount 1.07 l equals about 70% based on the total equivalent weight of Al and Ti. The resultant mixture was further stirred for about 30 minutes.

The resultant reaction solution was dehydrated, and the resultant solid was washed with water, then dried and fired in an electric furnance at 600° C. for 2 hours. The fired product was subjected to powder X-ray diffractometry to show that it had a structure of an anatase-type titanium oxide and a lattice constant $C_0$ of 9.44 Å, which was smaller than the 9.51 Å lattice constant of an anatase-type $TiO_2$ (see ASTM 4-0477). Thus, it was shown that the fired product was a solid solution of $Al_2O_3$ in $TiO_2$ (Al has a smaller ionic radius than Ti). Chemical analysis of the fired product showed that it had a chemical composition of $Ti_{0.833}Al_{0.167}O_2$.

0.12 Gram of the fired product was put into 600 ml of distilled water [electric conductivity 23.6 μs/cm, pH=6.43 (25.5° C.)] containing 5.1 mg/l of $Co^{2+}$ and 6.4 mg/l of $Cl^-$, and and adsorption test was carried out with an autoclave at 280° C. for 1 hours. This distilled water was filtered with a No. 4 filter paper. And, the resultant filtrate was measured for Co ion by an atomic absorption method and for Cl ion by absorptiometry according to JIS K-0101.

In addition, the above pH was measured with a pH meter at 25.5° C., and the electric conductivity with an electric conductivity meter at 25.5° C.

EXAMPLE 2

0.4 Mol of $Al[OCH(CH_3)_2]_3$ and 1 mol of $Ti[OCH(CH_3)_2]_4$ were dissolved in 10 l of isopropyl alcohol at about 30° C., and while the resultant mixture was stirred with a chemistirrer, about 200 g of water was added. And, the resultant mixture was hydrolyzed by heating it up to about 70° C. The resultant reaction mixture was filtered, and the resultant solid was washed with water, and dried. The dried solid was fired in an electric furnance at 400° C. for 2 hours.

The fired product was subjected to powder X-ray diffractometry to show that it was an anatase-type $TiO_2$ and had a lattice constant $C_0$ of 9.40 Å. Chemical analysis thereof showed that it had a composition of $Ti_{0.714}Al_{0.286}O_2$.

0.12 Gram of this fired product was tested in the same way as in Example 1 to examine its adsorptivity for Co ion and Cl ion and its elution degree.

Table 1 shows the results.

EXAMPLE 3

0.5 Mol of $TiCl_4$ and 4 mol of $Al(NO_3)_3$ were dissolved in 5 l of water, and this mixture was charged into a container having a volume of about 10 l. While the mixture was maintained at about 20° C. and stirred with a chemistirrer, 1.4 l of ammonia water containing 8 mol/l of ammonia was added, and the resultant mixture was further stirred for about 30 minutes. The above amount of 1.4 l equals 80% based on the total equivalent weight of Ti and Al.

The resultant reaction mixture was dehydrated, washed with water, dried and fired in an electric furnance at 700° C. for 2 hours.

The resultant fired product was subjected to powder X-ray diffractometry to show that it was $\gamma$-$Al_2O_3$ and had a lattice constant $a_0$ of 7.96 Å, which was greater than the $a_0$=7.90 Å lattice constant of $\gamma$-$Al_2O_3$ (see ASTM 10-425). These data shows that the fired product was a solid solution of Ti (which has a greater ionic radius than Al) in $Al_2O_3$. Chemical analysis of the fired product showed that it had a chemical composition of $(Al_{0.89}Ti_{0.11})_2O_3$.

0.12 Gram of this fired product was tested in the same way as in Example 1 to examine its adsorptivity for Co ion and Cl ion and its elution degree.

Table 1 shows the results.

COMPARATIVE EXAMPLES 1 AND 2

Reagents, anatase-type titanium oxide (Comparative Example 1) and activated alumina (Comparative Example 2) (both supplied by Wako Junyaku K.K.), were tested on their adsorptivity for Co ion and Cl ion and degree of their elution into water in the same way as in Example 1.

Table 1 shows the results.

TABLE 1

|  | Example | | | Comparative Example | |
| --- | --- | --- | --- | --- | --- |
|  | 1 | 2 | 3 | 1 | 2 |
| Adsorption temperature (°C.) | 280 | 280 | 280 | 280 | 280 |
| Amount of Co adsorbed (meq/g) | 0.152 | 0.280 | 0.105 | 0.075 | 0.015 |
| Amount of Cl adsorbed (meq/g) | 0.014 | 0.014 | 0.092 | 0.010 | 0.010 |
| pH | 5.30 | 5.47 | 6.10 | 5.69 | 5.76 |
| Electric conductivity (μs/cm) | 29.0 | 27.1 | 28.0 | 29.0 | 28.4 |

Notes:
pH before addition of purifier: 6.43
Electric conductivity before addition of purifiere: 23.6 μs/cm (25.5° C.).

What is claimed is:

1. A purifier for nuclear reactor cooling water, which contains, as an active ingredient,
a titanium oxide-based solid solution of the formula (1)

$$(Ti_{1-x}Al_x)O_2 \tag{1}$$

wherein x is defined by $0<x<0.5$, and/or an aluminum oxide-based solid solution of the formula (2)

$$(Al_{1-y}Ti_y)_2O_3 \tag{2}$$

wherein y is defined by $0<y<0.5$.

2. A purifier according to claim 1, wherein the titanium oxide-based solid solution and the aluminum oxide-based solid solution are products which are produced by dissolving a water-soluble titanium compound and a water/soluble aluminum compound in water, adding an alkaline substance to form a co-precipitate, and firing the co-precipitate.

3. A purifier according to claim 2, wherein the titanium oxide-based solid solution and the aluminum oxide-based solid solution are products formed by firing the co-precipitate at a temperature of about 200° to 1,000° C.

4. A purifier according to claim 1, wherein the titanium oxide-based solid solution and the aluminum oxide-based solid solution are products formed by dissolving an organic compound of titanium and an organic compound of aluminum in an organic solvent, adding water to hydrolyze the compounds, and firing the resultant hydrolysis product of the compounds.

5. A purifier according to claim 4, wherein the titanium oxide-based solid solution and the aluminum oxide-based solid solution are products formed by firing the hydrolysis product at a temperature of about 200° to 1,000° C.

6. A purifier according to claim 1, which is a granulation product having a diameter of 1 to 50 mm.

* * * * *